US009596302B2

United States Patent
Salle et al.

(10) Patent No.: US 9,596,302 B2
(45) Date of Patent: Mar. 14, 2017

(54) MIGRATING APPLICATIONS BETWEEN NETWORKS

(75) Inventors: Mathias Salle, San Francisco, CA (US); Chandra H. Kamalakantha, Plano, TX (US); Reinier J. Aerdts, Plano, TX (US); Ilya Joel-Pitcher, Melbourne (AU)

(73) Assignee: Hewlett Packard Enterprise Development LP, Houston, TX (US)

( * ) Notice: Subject to any disclaimer, the term of this patent is extended or adjusted under 35 U.S.C. 154(b) by 157 days.

(21) Appl. No.: 14/394,544

(22) PCT Filed: Jul. 20, 2012

(86) PCT No.: PCT/US2012/047680
§ 371 (c)(1),
(2), (4) Date: Oct. 15, 2014

(87) PCT Pub. No.: WO2014/014477
PCT Pub. Date: Jan. 23, 2014

(65) Prior Publication Data
US 2015/0222702 A1 Aug. 6, 2015

(51) Int. Cl.
- G06F 15/16 (2006.01)
- H04L 29/08 (2006.01)
- G06F 9/48 (2006.01)

(52) U.S. Cl.
CPC ........ *H04L 67/1095* (2013.01); *G06F 9/4856* (2013.01); *H04L 67/02* (2013.01)

(58) Field of Classification Search
CPC .......................... G06F 9/45558; G06F 9/4856
(Continued)

(56) References Cited

U.S. PATENT DOCUMENTS

| 7,966,364 B2 | 6/2011 | Sundaram et al. |
| 2002/0019873 A1* | 2/2002 | Goldszmidt .......... G06F 9/4881 709/228 |

(Continued)

FOREIGN PATENT DOCUMENTS

| CN | 102377827 | 3/2012 |
| WO | WO2010089626 | 8/2010 |

OTHER PUBLICATIONS

MacVittie, L.; "Cloud Balancing, Reverse Cloud Bursting, and Staying PCI-compliant"; Jan. 24, 2010; http://cloudcomputing.sys-con.com/node/1256690.

(Continued)

*Primary Examiner* — Melvin H Pollack
(74) *Attorney, Agent, or Firm* — Fabian VanCott (57) ABSTRACT

A method of migrating a number of applications from a first network to a second network comprises, with a processor, creating a dependency data set for a first network, creating a migration plan to migrate a number of applications from the first network to a second network based on the dependency data set, and migrating a number of applications from the first network to the second network based on the migration plan. A migration device for migrating a number of applications from a first network to a second network, comprises a processor, and a data storage device communicatively coupled to the processor, in which the processor creates a dependency data set for the first network, and migrates a number of applications from the first network to the second network based on the dependency data set.

15 Claims, 4 Drawing Sheets

(58) Field of Classification Search
USPC .......................................................... 709/201
See application file for complete search history.

(56) References Cited

U.S. PATENT DOCUMENTS

| | | | |
|---|---|---|---|
| 2006/0101189 A1* | 5/2006 | Chandrasekaran | G06F 8/63 711/6 |
| 2008/0123534 A1 | 5/2008 | Gous | |
| 2010/0268812 A1 | 10/2010 | Mohrmann et al. | |
| 2011/0035755 A1* | 2/2011 | Huang | G06F 9/4856 718/106 |
| 2011/0246978 A1 | 10/2011 | Alfano et al. | |
| 2012/0137003 A1 | 5/2012 | Ferris et al. | |
| 2012/0151061 A1* | 6/2012 | Bartfai-Walcott | G06F 9/4856 709/226 |
| 2012/0151064 A1 | 6/2012 | Shin et al. | |
| 2012/0174112 A1 | 7/2012 | Vaidya | |
| 2013/0152076 A1* | 6/2013 | Patel | G06F 9/45558 718/1 |
| 2013/0166504 A1* | 6/2013 | Varkhedi | G06F 17/30581 707/610 |

OTHER PUBLICATIONS

PCT; "Notification of Transmittal of the International Search Report and the Written Opinion of the International Searching Authority, or the Declaration"; cited in PCT/US2012/047680; mailed Mar. 29, 2013; 11 pages.

Kapil Bakshi; Considerations for Cloud Data Centers: Framework, Architecture and Adoption; IEEEAC paper#1150, Version 2, 2011.

European Patent Office, "Extended European Search Report," dated Mar. 14, 2016, issued in EP Application No. 12881312.

Niccolai, J.; "Zynga Makes Dramatic Shift From Public Cloud"; Feb. 15, 2012; 4 pages http://www.computerworld.com/s/article/9224282/Zynga_makes_dramatic_shift_from_public_cloud.

Rashid, F.Y.; "GoGrid Private Cloud Uses Public Cloud Resources to Dynamically Expand Capacity"; Jan. 19, 2011; 3 pages http://www.eweek.com/c/a/Cloud-Computing/GoGrid-Private-Cloud-Uses-Public-Cloud-Resource-to-Dynamically-Expand-Capacity-804580/.

\* cited by examiner

MIGRATING APPLICATIONS BETWEEN NETWORKS

BACKGROUND

Cloud computing services have become increasingly available to individuals and business entities in order to allow those individuals or business entities to expand their information technology (IT) infrastructures and resources. These individuals and business entities often enter into contracts with the cloud services provider at times in which the individual's or business entity's internal IT infrastructures or resources are over-utilized or otherwise insufficient to accommodate an increase in network activity. This increase in network activity may be due to, for example, an increase in sells of their respective goods or services. In this manner, an individual or business entity may take advantage of the economies of scale associated with the public cloud computing services.

After purchasing public cloud computing services, the individuals or business entities may find that the costs associated with the public cloud computing services may outweigh its benefits. For example, the individuals or business entities may find it cheaper or more convenient to purchase IT infrastructure or resources and implement these resources internally and privately rather than purchasing public cloud computing services from the cloud services provider. However, it may be difficult for these individuals and business entities to implement their internal, private cloud computing network, and seamlessly migrate applications and application components from the public cloud network to their internal, private cloud computing network.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

The present systems and methods provide an autonomous method of migrating a number of programs and program components from a public cloud network to another cloud network such as, for example, a private cloud network. These systems and methods make it possible for users to scale in their cloud computing services by utilizing a private cloud network. In some cases, creating a private cloud network may be more cost effective for a cloud services purchaser than purchasing public cloud services.

As used in the present specification and in the appended claims, the term "cloud" is meant to be understood broadly as any network that delivers requested virtual resources as a service. In one example, a cloud network may provide a computing environment where users can have access to applications or computing resources, as services, from anywhere through their connected devices. These services may be provided by entities called cloud services providers. Examples of services that may be provided via a cloud network include infrastructure as a service (IaaS), platform as a service (PaaS), and software as a service (SaaS).

As used in the present specification and in the appended claims, the term "public cloud" is meant to be understood broadly as a number of services provided by a service provider over a network that makes applications, storage, and other resources available to the general public. In one example, these services are offered by the service provider on a pay-per-use model. In this example, the public cloud service providers own and operate the infrastructure. In another example, the public cloud service provider offers access via a public network such as, for example, the Internet, and direct connectivity is not offered. An example of a cloud service provided within a public cloud may be AMAZON WEB SERVICES developed and sold as a service by Amazon.com, Inc., or the RACKSPACE CLOUD web application hosting services developed and provided by Rackspace US, Inc.

As used in the present specification and in the appended claims, the term "private cloud" is meant to be understood broadly as any cloud computing environment in which access is exclusively limited to an individual or a business entity. In one example, a private cloud may be any cloud infrastructure operated solely for a single individual or business entity. In one example, the private cloud is managed internally by the owner of the private cloud infrastructure. In another example, the private cloud is managed by a third-party and hosted internally or externally.

As used in the present specification and in the appended claims, the term "scaling out" or similar language is meant to be understood broadly as any activity that allocates or consumes more resources within a cloud computing environment in order to accommodate an increase in network activity. Similarly, as used in the present specification and in the appended claims, the term "scaling in" or similar language is meant to be understood broadly as any activity that releases, frees up, or discharges the resources within a cloud computing environment.

As used in the present specification and in the appended claims, the term "dependency data set" is meant to be understood broadly as any data set that defines a number of relationships between applications and instances of network resources as deployed within a network. Thus, the dependency data set may be used to define how the applications may be deployed or scaled out. In one example, the dependency data set defines a number of relationships between applications and other instances of cloud network resources within a cloud services network such as, for example, a hardware layer, a virtualization layer, an operating system, software dependencies, other applications, application modules within the applications, properties of the applications, information regarding the version of the applications, binaries of the applications, properties of application modules within the applications, a load balancer, servers, the types of servers, web servers within a network, application servers within a network, databases within the hardware layer, cloud services, credentials, monitoring or management tools used in the public cloud, and service offerings consumed within the public cloud, among others.

Figure 1:
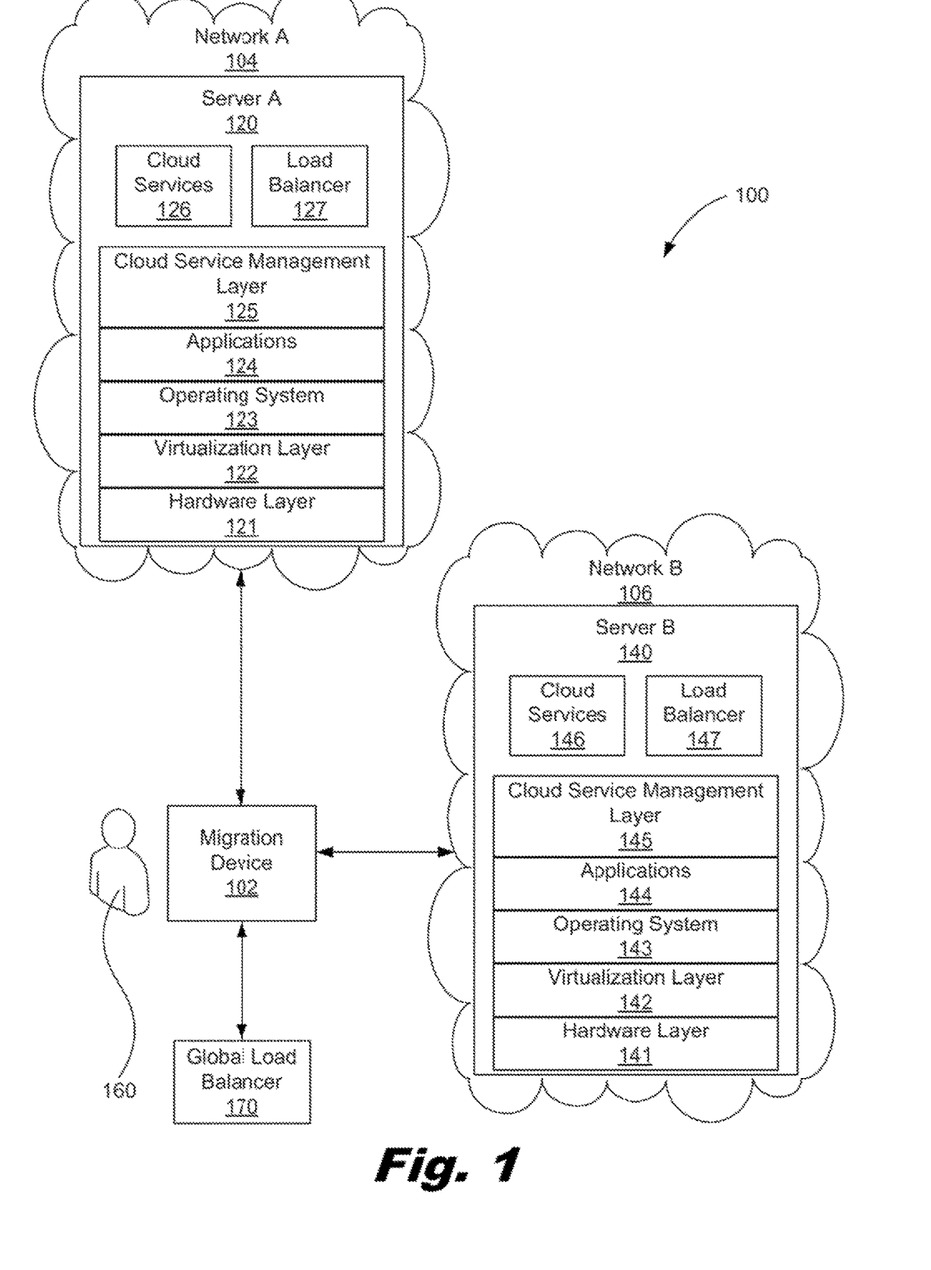
FIG. 1 is a block diagram of a system for migrating applications from a public cloud to a private cloud, according to one example of the principles described herein.

In one example, the dependency data set may be represented as a hierarchal tree with a root node symbolizing a root resource, and a number of levels of child nodes symbolizing the relationship of a number of resources and their dependency from the root resource and their dependency with each other. Lines between the root node and the child nodes symbolize the relationships and dependencies between the various elements within network A (104).

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to FIG. 1, a block diagram of a system for migrating applications from a public cloud to a private cloud, according to one example of the principles described herein is shown. FIG. 1 depicts a system (100) for migrating a number of applications from a public cloud supported by a public cloud service provider to another cloud service such as, for example, an internal private cloud. The system (100) may comprise a migration device (102) that has access to a number of networks; network A (104) and network B (106). Although two networks (104, 106) are shown in FIG. 1, any number of networks (104, 106) may be communicatively coupled to the migration device (102). In one example, the networks are cloud services networks as defined above. Throughout the present specification and drawings, network A (104) and network B (106) will be described as cloud services networks. However, any form of network may be employed in bringing about the objectives of the present systems and methods.

The networks (104, 106) may comprise a number of servers (120, 140). In the example, of FIG. 1, each network (104, 106) comprises one server (120, 140). However, each network (104, 106) may comprise any number of servers (120, 140). As shown in FIG. 1, each server comprises a hardware layer (121, 141) comprising, for example, a processor and memory, among other computer hardware devices to form a computing device.

The hardware layer (121, 141) supports a virtualization layer (122, 142). The virtualization layers (122, 142) within the servers (120, 140) provide an abstraction layer from which the virtual entities such as, for example, virtual servers; virtual storage; virtual networks, including virtual private networks; virtual applications and operating systems; and virtual clients, among others may be instantiated. Specifically, a number of operating systems (123, 143) and applications (124, 144) may be executed by a processor in the hardware layers (121, 141). Although only one operating system (123, 143) and application (124, 144) are shown within the servers (120, 140) of FIG. 1, any number of virtual machines comprising their own respective operating systems and applications may be instantiated within the servers (120, 140) to provide a user or a number of different users access to these virtual resources.

In one example, the applications (124, 144) executed on the servers (120, 140) may be executed on the same or different types of respective operating systems (123, 143). Each of the applications (124, 144) and their respective operating systems (123, 143) may be associated with additional virtual resources supported by the hardware layers (121, 141) such as, for example a processor, memory, network adapters, and data storage device, among others.

The cloud service management layers (125, 145) within the networks (104, 106) provide management of cloud services residing on the servers (120, 140) within the networks (104, 106). In one example, the cloud service management layers (125, 145) provision resources. Resource provisioning provides dynamic procurement of computing resources and other resources that are utilized to perform tasks within the cloud computing environment. In another example, the cloud service management layers (125, 145) provide service level management where cloud computing resources are allocated such that contracted service levels are met. In still another example, the cloud service management layers (125, 145) perform a combination of he above services.

A number of cloud services (126, 146) are supported by the servers (120, 140) within the networks (104, 106). As described above, examples of services that may be provided via a cloud network include infrastructure as a service (IaaS), platform as a service (PaaS), and software as a service (SaaS). Thus, the applications (124, 144), operating systems (123, 143), cloud service managements layer (125, 145), and hardware layer (121, 141) may be used to provide a user with a number of these types of services. In one example, the cloud services (126, 146) support an underlying service in which the user or purchaser of the cloud services (126, 146) is engaged. For example, the user or purchaser of the cloud services (126, 146) may, in one example, be engaged in selling goods or services themselves, and do so through the cloud services (126, 146) provided by the owner and operator of network A (104) for example.

In the present example, for the purposes of simplicity in illustration, the migration device (102), server A (120) and server 8 (140) are separate computing devices communicatively coupled to each other through their respective networks (104, 106) and the migration device (102). However, the principles set forth in the present specification extend equally to any alternative configuration. As such, alternative examples within the scope of the principles of the present specification include, but are not limited to, examples in which the migration device (102), server A (120) and server B (140) are implemented by the same computing device, examples in which the functionality of the migration device (102), server A (120) or server B (140) is implemented by multiple interconnected computers, and examples in which migration device (102), server A (120) and server B (140) communicate directly through a bus without intermediary network devices.

In another example, the migration device (102) may be implemented on either server A (120) or server B (140) in order to manage the migration of applications and other instances of cloud network resources from network A (104) to network B (106), or visa versa. In still another example, the migration device (102) may be implemented by a third party as a service. In this example, the third party may be a organization or business entity such as, for example, Hewlett Packard with its developed CLOUDSYSTEM cloud network infrastructure that assists in building private, public, and hybrid cloud computing environments by combining storage, servers, networking, and software.

In one example, a global load balancer (170) may be communicatively coupled to the migration device (105) as well. Like the load balancers (127, 147), the global load balancer (170) comprises a set of policies that define where transaction requests are directed. In this manner, the global load balancer (170) distributes workloads across the system (100) or other resources to achieve optimal resource utilization, maximize throughput, minimize response time, and avoid overload. The global load balancer (170) further acts as the load balancer for the private network B (106) during certain points of the migration process. In one example, the policies within the global load balancer (170) may be updated in order to redirect traffic from network A (104) to network B (106), or visa versa. In one example, the processor (FIG. 2, 202) of the migration device (102) has access to and may control the global load balancer (170)

Figure 2:
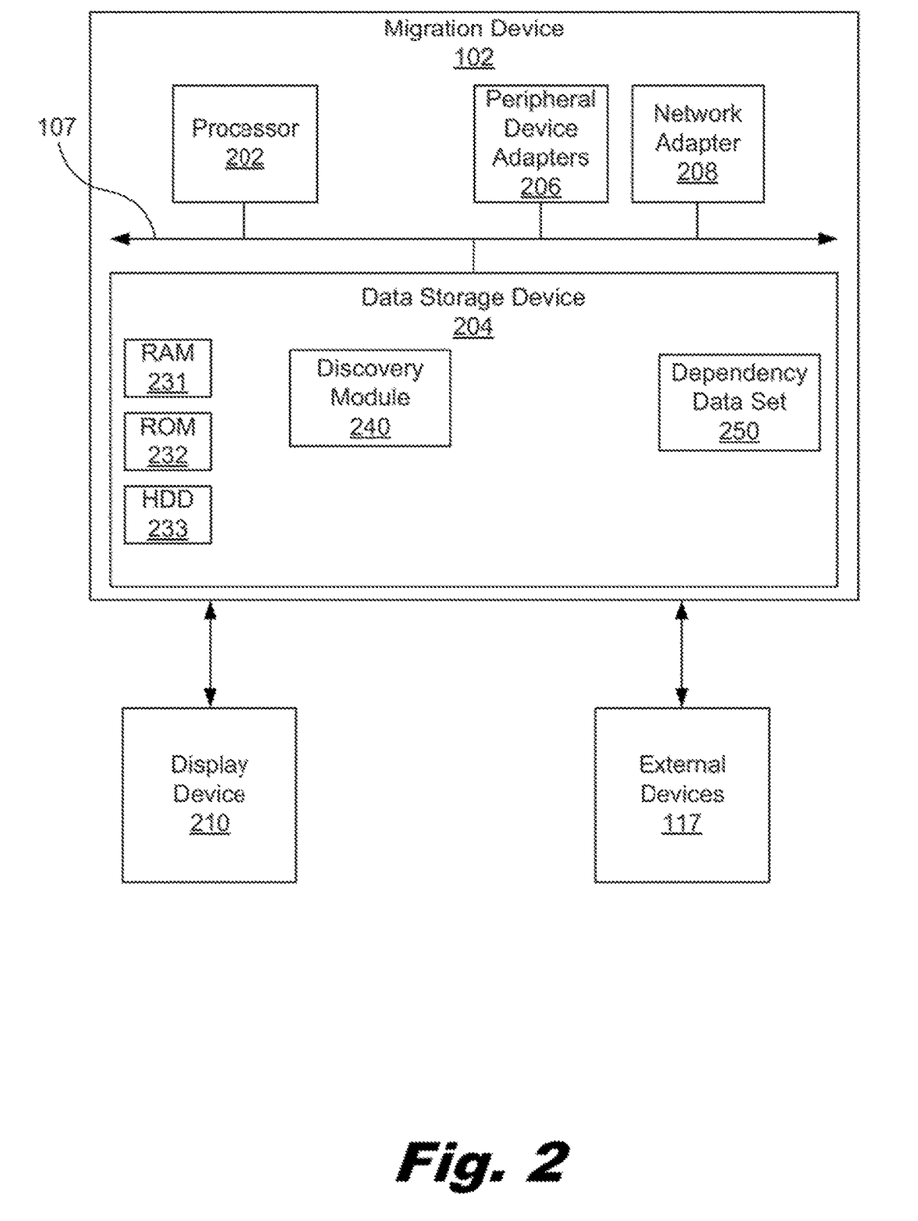
FIG. 2 is a block diagram of the migration device of FIG. 1, according to one example of the principles described herein.

As described above, the system (100) may further comprise a migration device (102). The migration device (102) provides access to the cloud computing environment created by the networks (104, 106) for consumers and system administrators (160), and migrates applications and other instances of cloud network resources as will be described in more detail below. FIG. 2 is a block diagram of the migration device of FIG. 1, according to one example of the principles described herein.

In one example, the migration device (102) is a computing device that performs the methods described herein. In another example, the migration device (102) is a mobile computing device such as, for example, a mobile phone, smart phone, personal digital assistant (PDA), or a laptop computer with the capability of performing the methods described herein.

To achieve its desired functionality, the migration device (102) comprises various hardware components. Among these hardware components may be at least one processor (202), at least one data storage device (204), peripheral device adapters (206), and a network adapter (208). These hardware components may be interconnected through the use of a number of busses and/or network connections. In one example, the processor (202), data storage device (204), peripheral device adapters (206), and a network adapter (208) may be communicatively coupled via bus (107).

The processor (202) may include the hardware architecture that retrieves executable code from the data storage device (204) and execute the executable code. The executable code may, when executed by the processor (202), cause the processor (202) to implement at least the functionality of manage the migration of applications and other instances of cloud network resources from network according to the methods of the present specification described below. In the course of executing code, the processor (202) may receive input from and provide output to a number of the remaining hardware units.

The data storage device (204) may store data such as executable program code that is executed by the processor (202) or other processing device. As will be discussed, the data storage device (204) may specifically store a number of applications that the processor (202) executes to implement at least the functionality of managing the migration of applications and other instances of cloud network resources from a first network to a second network.

The data storage device (204) may include various types of memory modules, including volatile and nonvolatile memory. For example, the data storage device (204) of the present example includes Random Access Memory (RAM) (231), Read Only Memory (ROM) (232), and Hard Disk Drive (HDD) memory (233). Many other types of memory are available in the art, and the present specification contemplates the use of many varying type(s) of memory (130) in the data storage device (204) as may suit a particular application of the principles described herein. In certain examples, different types of memory in the data storage device (204) may be used for different data storage needs. For example, in certain examples the processor (202) may boot from Read Only Memory (ROM) (232), maintain nonvolatile storage in the Hard Disk Drive (HDD) memory (233), and execute program code stored in Random Access Memory (RAM) (231).

Generally, the data storage device (204) may comprise a computer readable storage medium. For example, the data storage device (204) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The hardware adapters (206, 208) in the migration device (102) enable the processor (202) to interface with various other hardware elements, external and internal to the migration device (102). For example, peripheral device adapters (206) may provide an interface to input/output devices, such as, for example, display device (210), to create a user interface and/or access external devices (117). As will be discussed below, an output device (150) may be provided to allow a user (FIG. 1, 160) to interact with and implement the functionality of the migration device (102).

Peripheral device adapters (206) may also create an interface between the processor (202) and a printer, the display device (210), or other media output device. The network adapter (208) may provide an interface to the networks (104, 106), thereby enabling the transmission of data between the migration device (102), and networks (104, 106).

The migration device (102) may further comprise a discovery module (240). The discovery module (240) searches for and identifies assets such as programs and other program components hosted on a public cloud network such as, for example, network A (104), from which the programs and other program components are to be migrated. In one example, the discovery module (240) is stored within the data storage device (204) of the migration device (102), and is accessible and executable by the processor (202).

The migration device (102) further comprises a dependency data set (250) stored within the data storage device (204). The dependency data set (250) is created as a result of the discovery module (240) discovering programs and other program components within the public network A (104). The processor (202) analyzes the results of the discovery module (240) and creates the dependency data set (250). As defined above, the dependency data set (250) is any data set that defines a number of relationships between applications and instances of network resources as deployed within a network.

Figure 3:
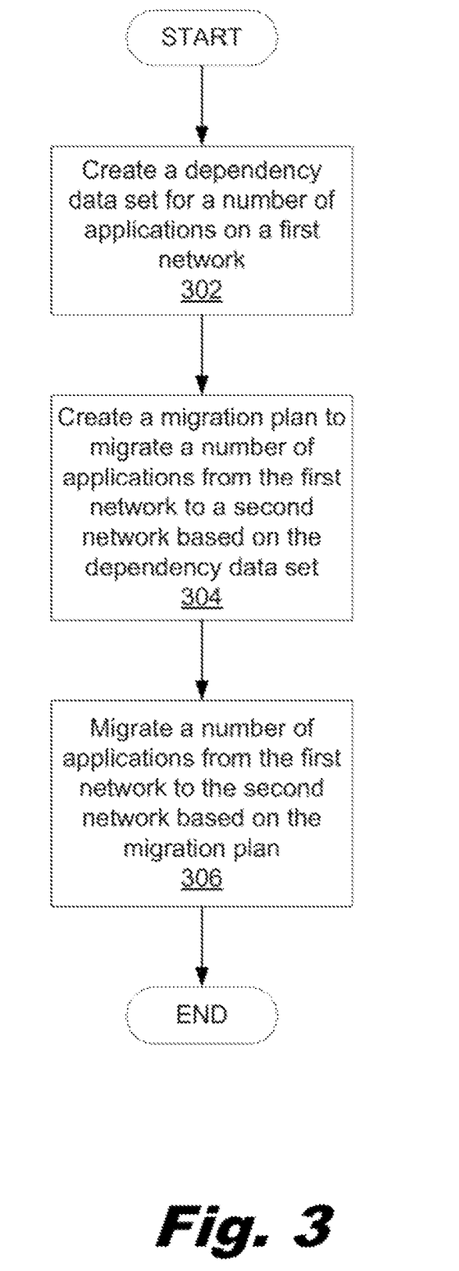
FIG. 3 is a flowchart showing a method of migrating a number of applications from a first network to a second network, according to one example of the principles described herein.

FIG. 3 is a flowchart showing a method of migrating a number of applications (124, 144) from a first network (104) to a second network (106), according to one example of the principles described herein. The method of FIG. 3 may begin by creating (block 302) a dependency data set for a number of applications on a first network. This network may be network A (104) of FIG. 1, for example. The migration device (FIG. 2, 102) creates the dependency data set.

A dependency data set, as defined above, is any data set that defines a number of relationships between applications and other instances of cloud network resources within a network. The processor (202) analyzes and maps the relationships and dependencies between the applications and instances of network resources within network A (104). In one example, the dependency data set may be represented as a hierarchal tree with a root node symbolizing a root resource, and a number of levels of child nodes symbolizing the relationship of a number of resources and their dependency from the root resource and their dependency with each other. Lines between the root node and the child nodes symbolize the relationships and dependencies between the various elements within network A (104).

Turning again to FIG. 3, the migration device (FIG. 2, 102) creates (block 304) a migration plan to migrate a number of applications from the first network to a second network based on the dependency data set. For example, the migration plan may call for the migration of a number of applications from network A (104) to network B (106) of FIG. 1. In this example, network A (104) is a public cloud, and network B is a private cloud service (106), and a purchaser of the public cloud services has deemed, for example, that the cost to purchase public cloud services is higher than the cost to build a private network and implement the applications on that private network. Other reasons exist as to why a user of cloud services may decide to move cloud services from a public cloud to a private cloud.

In one example, the migration of applications may take place in a piece meal manner where applications are transferred when they are not currently being utilized. In another example, migration of applications may take place irrespective of the application's current use state.

The migration device (FIG. 2, 102) migrates (block 306) a number of applications from the first network to the second network based on the migration plan. Thus, the applications which the purchaser of the public cloud services wishes to migrate (block 306) from network A (104) to network B (106) is accomplished according to the migration plan created at block 304. In this manner, application migration is completed. As more detail may be provided in association with blocks 302, 304, and 306, the method will now be described in more detail in association with FIG. 4.

Figure 4:
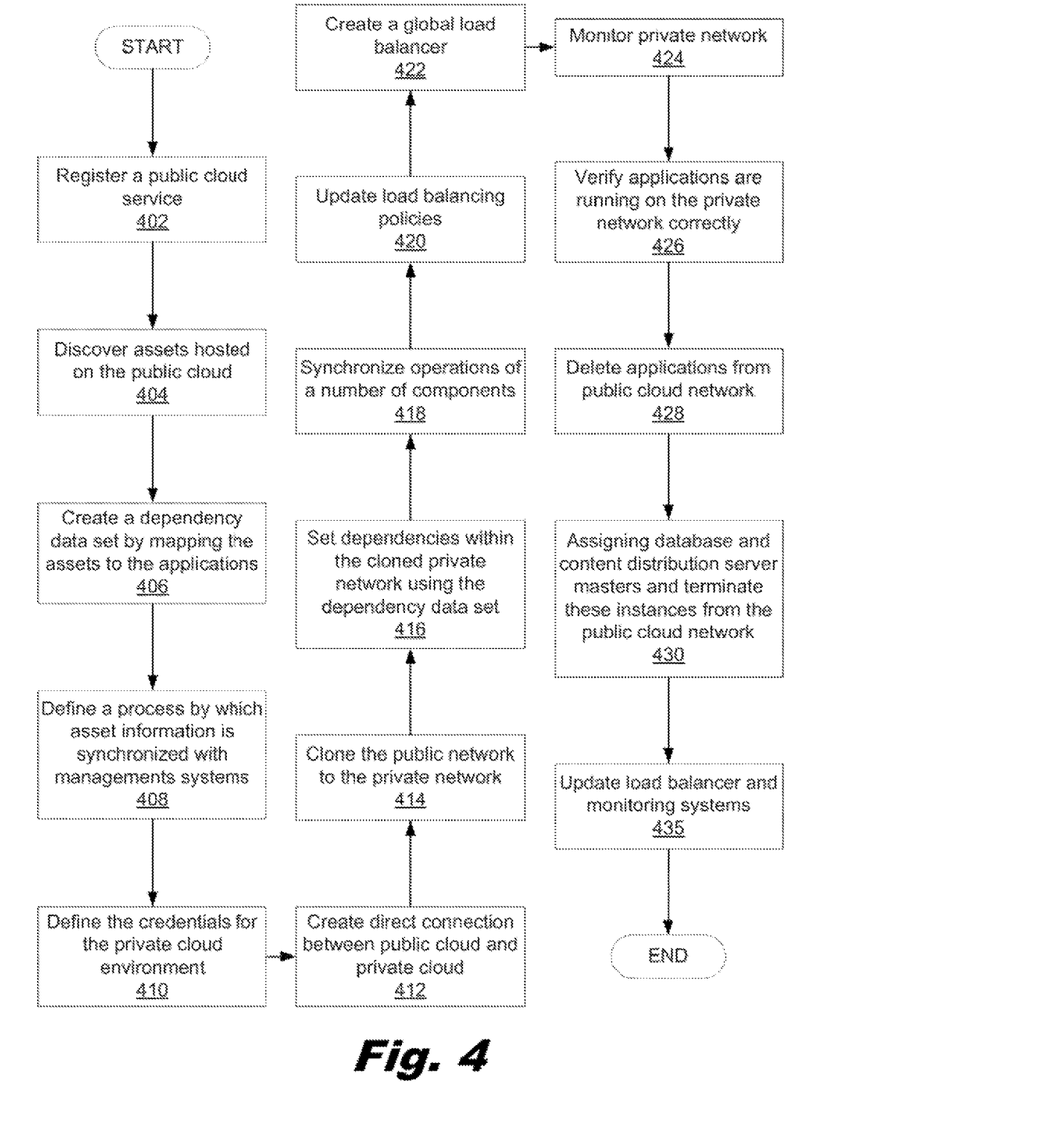
FIG. 4 is a flowchart showing a method of migrating a number of applications from a first network to a second network, according to another example of the principles described herein.

FIG. 4 is a flowchart showing a method of migrating a number of applications from a first network to a second network, according to another example of the principles described herein. The method of FIG. 4 may begin by registering (block 402) a public cloud service. In one example, the purchaser of a public cloud services from a public cloud provider enters into a contract or other service agreement to purchase the public cloud services and utilize the network A (104) for these services. For example, the public cloud services may be based on a pay-per-use model where the public cloud services are scaled in or scaled out depending on the resource needs of the purchaser.

However, as described above, there may come a point during receipt of the public cloud services that the purchaser no longer wishes to utilize the public cloud services and, instead, wishes to implement his or her applications on a different cloud service such as, for example, a private cloud network or a public cloud network different from the public cloud services offered on network A (104). From the perspective of network A (104), this migration process may be interpreted as a scaling out to another network such as network B (106). From the perspective of network B (106), this migration process may be interpreted as a scaling in from network A (104). In one example, the migration process comprises scaling out from network A (104) to network B (106) without scaling back into network A (104). In this example, when resources are utilized in network B (106) by scaling out from network A (104), resources utilized within network A (104) are dropped, removed, or otherwise not utilized.

Therefore, a migration of the applications from network A (104) to network B (106), for example, may be implemented. At block 404, the migration device (102) discovers assets hosted on the public cloud network; in this case network A (104). In one example, the discovery module (240) within the data storage device (204) discovers (block 404) the assets hosted on network A (104).

The migration device (102) creates (block 406) a dependency data set by mapping the assets within network A (104) discovered at block 404 with the applications to be migrated to network B (106). In one example, a copy of the dependency data set (250) is stored in the data storage device (204) of the migration device (102) for utilization at a point later in the migration process as will be described below. Also, in one example, an administrator (160) may perform the mapping or instruct the migration device (102) to perform the mapping via the display device (210) and a number of other input and output devices such as, for example, a keyboard and mouse, among others.

The process may proceed with the administrator (160) interacting with the migration device (102) to define (block 408) a process by which asset information is synchronized with management systems. The migration device (102) also defines (block 410) a number of credentials and related information for the private cloud environment to be implemented later in the process. Applications running on a cloud network such as, for example, networks A and B (104, 106) are being monitored. These applications (124, 144) and the networks (104, 106) are monitored in order to determine how the network (104, 106) is being utilized and whether the network should be scaled in or scaled out to increase or decrease services, respectively. Some examples of actions that may be monitored are the number of in-coming transactions to the network (104, 106), response times of the applications (124, 144), and availability of servers (120, 140) to address in-coming transactions, among others. Thus, at block 408, the migration device (102) defines the synchronization processes to be implemented in network B (106) after migration begins.

The migration device (102) creates (block 412) a direct connection between the public network A (104) and the private network B (106), with the migration device (102) being an intermediary. A cloning (block 414) of the public network A (104) and its application components to the private network B (106) may then be initiated. For example, if network A (104) comprises a particular web server or application server such as, for example, an APACHE HTTP server owned and developed by the Apache Software Foundation, then this server is cloned (block 414) within network B (106) to function the same and comprise the same parameters as the version of the server within network A (104). Application components that may be cloned from network A (104) to network B (106) comprise, for example, web servers, and application servers, among many others. The migration device (102) in association with block 414, sets (block 416) dependencies within the cloned private network (106). In setting (block 416) these dependencies, the migration device utilizes the dependency data set (250) created at block 406 and stored within the data storage device (204) of the migration device (102). Thus, the dependencies among the various application components are defined after a clone of the application components are created in the private network (106).

The migration device (102) synchronizes (block 418) operations of a number of components within network A (104) that were cloned within network B (106). Some components within a cloud network such as, for example, a web server are stateless in that they simply reply to requests. However, some components, such as a database, are dynamically changing as the network is utilized. For example, network A (104) may comprise a number of dynamic components such as a database that are continually changing. If the database was copied directly from network A (104) to network B (106), intermediate transactions may occur on network A (104) that would not be reflected within the copy of the database in network B (106). Therefore, at block 418, the migration device begins to synchronize these dynamic components between network A (104) and network B (106) to ensure that the components are mirrored between network A (104) and network B (106). In one example, the migration device (102) ensures that the load balancer (127) within network A (104) is utilized at least until the cloned dynamic components are completely synchronized. After the cloned dynamic components are completely synchronized, the migration device (102) may then adjust load balancing policies within the system (100).

The migration device (102) then updates (block 420) a number of load balancing policies. The load balancers (127, 147) within the system (100) generally receive in-coming transaction (HTTP) requests and assign those transaction requests to a server (120, 140) within the network (104, 106). Thus, at block 420, the migration device (102) may update the load balancing policies used by the load balancers (127, 147) to include the ability to use the newly cloned load balancer (147) within network B (106) and its associated application components and resources.

In connection with block 420 described above, at one point, a global load balancer (242) is created (block 422). The global load balancer (170) comprises a set of policies that define where transaction requests are directed. In this manner, the global load balancer (170) distributes workloads across the system (100). These policies within the global load balancer (170) may be updated in order to redirect traffic from network A (104) to network B (106), or visa versa. In the example described below, the policies within the global load balancer (170) are updated to direct new transaction requests to network B (106) instead of network A (104) due to the migration of applications and application resources from public network A (104) to private network B (106).

TABLE 1

Application Deployment Instructions

| Application | Application Name | Install Sequencing |
|---|---|---|
| MySQL Database server | Database | 1 |
| Apache Tomcat Application With Block Storage | Application Server | 2 |
| Apache Web Server | Web Server | 3 |
| HAProxy | HAProxy LB | 4 |
| Global Load Balancer | HAProxy LB | 5 |

Table 1 shows the application deployment instructions executed in the above processes for scaling out and updating the global load balancer (170). As described above, the install sequencing is automatically derived by the migration device (102) based on the dependency data set (250) created and stored as described above. Similar application deployment instructions may be utilized to shutdown and terminate instances of public cloud infrastructure as will be described below.

In one example, the global load balancer (170) may update a load balancing policy within load balancer (127) to instruct the load balancer (127) to transmit new transaction requests to either the load balancer (147) in network B (106) or the global load balancer (170) who will then forward those new transaction requests on to the load balancer (147) in network B (106).

Once application components are placed within the private network B (106), the private network B (106) is then monitored (block 424). As described above, monitoring of a cloud network assists an administrator in knowing when to scale in or scale out. Also, monitoring the program components helps the administrator know when a number of program components are over-utilized, malfunctioning, or experiencing any other abnormal or undesirable condition within network B (106).

The migration device (102) may be used to verify (block 426) that the applications within network B (106) as cloned are running correctly. Thus, at block 426, an administrator (160) may instruct the migration device (102) to launch network B (106) by accepting, for example, transaction requests to ensure that all program components are correctly executing and are cooperating among each other.

After network B (106) has been verified and the application components are present within network B (106), the migration device (102) may delete (block 428) a number of applications and application components from the public network A (104). In one example, all the applications and application components associated with the purchaser's or user's use of the public cloud services are deleted. In this manner, web servers, application servers, applications, and other application components are terminated and deleted from network A (104).

The process continues with the migration device (102) assigning (block 430) the database and content distribution server as masters within network B (106) and terminating mirror instances of these components within network a (104). Further, the migration device (102) may also update (435) the load balancer (147) and other monitoring systems within network B (106) to direct transaction requests to network B (106).

The methods described in FIGS. 3 and 4 may be performed by any individual. In one example, these methods are performed by a third party. In this example, the third party may be someone other than the owner or owners of public network A (104) or private network B (106). Thus, the third party may offer the above migration methods as a service. In another example, the methods of FIGS. 3 and 4 may be performed by an administrator associated with the private network B (106). In this example, the administrator may be an employee or the owner of private network B (106) or a person who is contracted to perform such services.

The migration of applications is a migration from a public cloud operated by a public cloud service provider to another network. In one example, the second network, network B (106) may be a private cloud network as described above. In another example, the second network, network B (106) may be a different public cloud operated by the same or a different public cloud service provider.

The methods described above can be accomplished by a computer program product comprising a computer readable storage medium having computer usable program code embodied therewith that when executed performs the above methods. Specifically, the computer usable program code may create (block 302) a dependency data set for a number of applications on a first network. The computer usable program code may further create (block 304) a migration plan to migrate a number of applications from the first network to a second network based on the dependency data set. Still further, the computer usable program code may migrate (block 306) a number of applications from the first network to the second network based on the migration plan. Further, the computer usable program code may, when executed by a processor, perform the processes described above in connection with FIG. 4.

The specification and figures describe a method of migrating a number of applications from a first network to a second network. The method may comprise with a processor, creating a dependency data set for a first network, creating a migration plan to migrate a number of applications from the first network to a second network based on the dependency data set, and migrating a number of applications from the first network to the second network based on the migration plan.

These migration systems and methods may have a number of advantages, including: (1) the ability to discover program components existing on a public cloud network; (2) create a dependency data set to assist in the cloning of a public network infrastructure into a private cloud or other cloud network; (3) scale in cloud resources and allow the shutdown or termination of program components within a public cloud network; and (4) update program components data in management and monitoring systems.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of migrating a number of applications from a first network to a second network, the method comprising:
   creating, by a processor of a migration device, a dependency data set for a first network;
   creating, by the processor, a migration plan to migrate a number of applications from the first network to a second network based on the dependency data set;
   migrating, by the processor, the number of applications from the first network to the second network based on the migration plan;
   synchronizing, by the processor, dynamically changing components in the first network with dynamically changing components in the second network; and
   adjusting, by the processor, a load balancing policy to utilize the number of migrated applications in the second network after the synchronizing of the dynamically changing components.

2. The method of claim 1, further comprising removing the number of the applications from the first network if the applications have been migrated to the second network.

3. The method of claim 1, in which the first network is a public network, and the second network is a private network.

4. The method of claim 1, in which the method is performed by a service provider other than the owner of the second network.

5. The method of claim 1, in which the method is performed by the owner of the second network.

6. The method of claim 1, further comprising:
   discovering a number of programs within the first network; and
   creating the dependency data set based on the relationships between the discovered programs.

7. The method of claim 1, wherein migrating the number of applications further comprises cloning the number of applications from the first network into the second network.

8. The method of claim 1, wherein adjusting a load balancing policy includes:
   updating load balancing policies of a number of local load balancers in the first and second networks; and
   creating a set of policies in a global load balancer to direct transaction requests to the second network after the migration of the number of applications.

9. The method of claim 1, further comprising verifying the second network functions in an intended manner.

10. A migration device for migrating a number of applications from a first network to a second network, comprising:
    a processor; and
    a data storage device communicatively coupled to the processor, wherein the data storage device stores machine readable instructions that when executed by the processor cause the processor to:
    create a dependency data set for the first network;
    migrate a number of applications from the first network to the second network based on the dependency data set;
    synchronize dynamically changing components in the first network with dynamically changing components in the second network; and
    adjust load balancing policies to utilize the number of migrated applications in the second network after the synchronization of the dynamically changing components.

11. The migration device of claim 10, in which the migration device is communicatively intermediary to the first network and the second network.

12. The migration device of claim 10, further comprising a load balancer to update the load balancing policies within the first and second networks, and create a set of policies to direct transaction requests to the second network after the migration of the applications.

13. A computer program product for migrating a number of applications, the computer program product comprising:
    a non-transitory computer readable storage medium storing computer usable program code that when executed by a processor of a migration device cause the migration device to:

discover a number of applications within a first network;
create a dependency data set based on the relationships between the discovered applications;
create a migration plan to migrate the applications from the first network to a second network based on the dependency data set;
migrate the applications from the first network to the second network based on the migration plans;
synchronize dynamically changing components in the first network with dynamically changing components in the second network; and
adjust load balancing policies to utilize the migrated applications in the second network after the synchronization of the dynamically changing components.

14. The computer program product of claim 13, wherein the computer usable program code is further to, when executed by the processor, remove the applications from the first network after the applications have been migrated to the second network.

15. The computer program product of claim 13, wherein the computer usable program code is further to, when executed by the processor, create a set of policies to direct transaction requests to the second network after the migration of the applications.

* * * * *